(12) United States Patent
Koziatek

(10) Patent No.: US 7,055,569 B2
(45) Date of Patent: Jun. 6, 2006

(54) TUBELESS TIRE COMPOUND AND A SYSTEM AND METHOD FOR RETROFITTING NON-TUBELESS TIRES

(76) Inventor: Stanley Koziatek, 3309 Chambers Rd., Horseheads, NY (US) 14845

( * ) Notice: Subject to any disclaimer, the term of this patent is extended or adjusted under 35 U.S.C. 154(b) by 105 days.

(21) Appl. No.: 10/931,706

(22) Filed: Aug. 31, 2004

(65) Prior Publication Data

US 2005/0039839 A1   Feb. 24, 2005

Related U.S. Application Data

(62) Division of application No. 10/055,198, filed on Jan. 22, 2002, now Pat. No. 6,782,931.

(51) Int. Cl.
*B60C 5/00* (2006.01)
*B60C 5/16* (2006.01)

(52) U.S. Cl. ............. 152/502; 152/375; 152/503; 523/166

(58) Field of Classification Search ........... 152/375, 152/378 R, 379.3, 379.4, 379.5, 380, 381.3, 152/381.4, 381.5, 382, 383, 502, 503, 504
See application file for complete search history.

(56) References Cited

U.S. PATENT DOCUMENTS

| | | | | |
|---|---|---|---|---|
| 4,501,825 A | * | 2/1985 | Magyar et al. | 521/78 |
| 4,658,876 A | * | 4/1987 | Augier | 152/394 |
| 6,605,654 B1 | * | 8/2003 | Fang et al. | 523/166 |

FOREIGN PATENT DOCUMENTS

JP             08108703         * 4/1996

* cited by examiner

*Primary Examiner*—Justin Fischer
(74) *Attorney, Agent, or Firm*—George R. McGuire; Bond, Schoeneck & King, PLLC

(57) ABSTRACT

The present invention provides a compound, system, and method for retrofitting and converting standard bicycle rims and tires having tube to be tubeless. Standard tube tires are retrofitted by installing either rim tape or a rim strip with integral valve stem around the inner channel of the rim, mounting the first bead of the tire, injecting a liquid sealing compound into the tire cavity, finishing mounting the tire, inflating and installing the tire on a bicycle. The sealing compound may additionally contain propylene glycol or an aggregate material to encourage the sealing of the tires as punctures occur when the tire system is placed into use.

11 Claims, 4 Drawing Sheets

TUBELESS TIRE COMPOUND AND A SYSTEM AND METHOD FOR RETROFITTING NON-TUBELESS TIRES

CROSS-REFERENCE TO RELATED APPLICATIONS

The present application is a divisional of application Ser. No. 10/055,198, filed on Jan. 22, 2002, now U.S. Pat. No. 6,782,931.

BACKGROUND OF THE INVENTION

1. Field of Invention

The present invention relates generally to tubeless bicycle tires, and more particularly to a compound for sealing tubeless tires, and a system and method for retrofitting and converting bicycle tires having tube to tubeless tires.

2. Description of the Prior Art

Tubeless tires for bicycles and other wheeled vehicles are known in the art. Generally, tubeless tires are manufacture from thicker gauge rubber and often contain additional material on the inside of the tire to insure an airtight seam with the tire rim. Tubeless tires also require special rims which are designed to provide an airtight seal with the tire.

The specially manufactures tubeless tiers and rims are typically more expensive than non-tubeless tires and rims. Tubeless tires and rims are also heavier than the non-tubeless tires and rims, due in part to the extra materials and design components necessary to provide an airtight seal between the tube and rim.

3. Objects and Advantages

It is a principal object and advantage of the present invention to provide a system for retrofitting non-tubeless tiers to run tubeless.

It is an additional object and advantage of the present invention to provide a tubeless tire system which is lighter than conventional systems.

It is a further object and advantage of the present invention to provide a tubeless tire system which is cheaper than conventional systems.

It is another object and advantage of the present invention to provide a compound for sealing punctures as they are formed in a tire.

Other objects and advantages of the present invention will in part by obvious, and in part appear hereinafter.

SUMMARY OF THE INVENTION

In accordance with the foregoing objects and advantages, the present invention provides a compound and system for retrofitting and converting traditional bicycle tires having tubes to be tubeless. The system comprises a layer of rim tape or a rim strip with integral valve stem disposed on the inner channel of the rim and a latex sealing compound injected into the tire cavity. The sealing compound is a mixture of liquid latex containing ammonia with water. Sealing compound may additionally contain propylene glycol and/or an aggregate material. Standard tube tires are retrofitted by installing the rim tape or rim strip with integral valve stem around the inner channel of the rim, mounting the first bead of the tire, injecting the liquid sealing compound into the tire cavity, mounting the second bead of the tire, and installing the tire on a bicycle.

DETAILED DESCRIPTION

Figure 1:
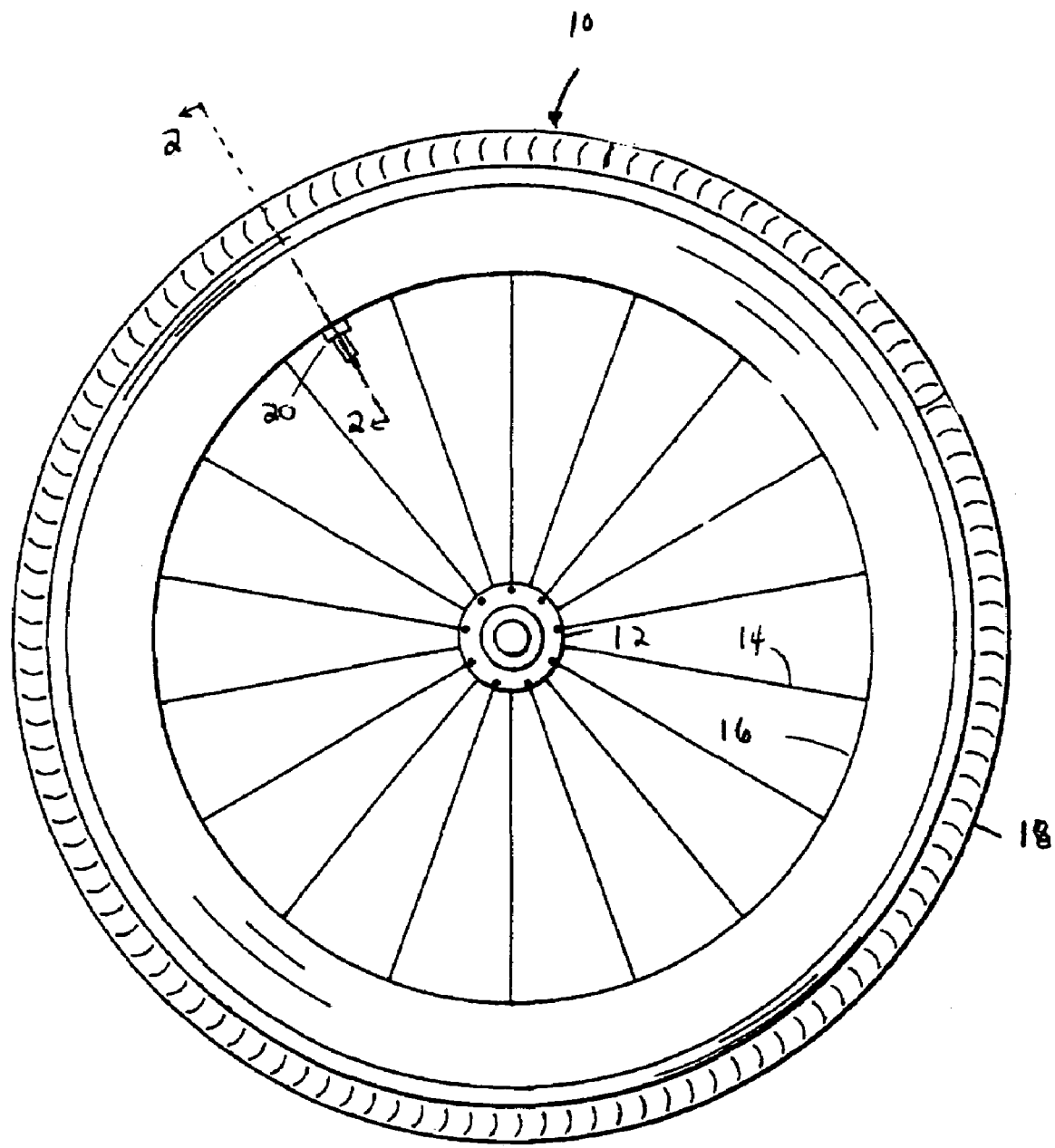
FIG. 1 is a traditional bicycle wheel.

Referring now to the drawings in which like reference numerals refer to like parts throughout, there is seen in FIG. 1 a traditional bicycle wheel 10 comprising a hub 12, a plurality of spokes 14 engages with hub 12 and supporting a circular rim 16, a tire 18 mounted within rim 16, and a valve 20 communicating with an inflatable inner tube (not shown) within tire 18.

Figure 2:
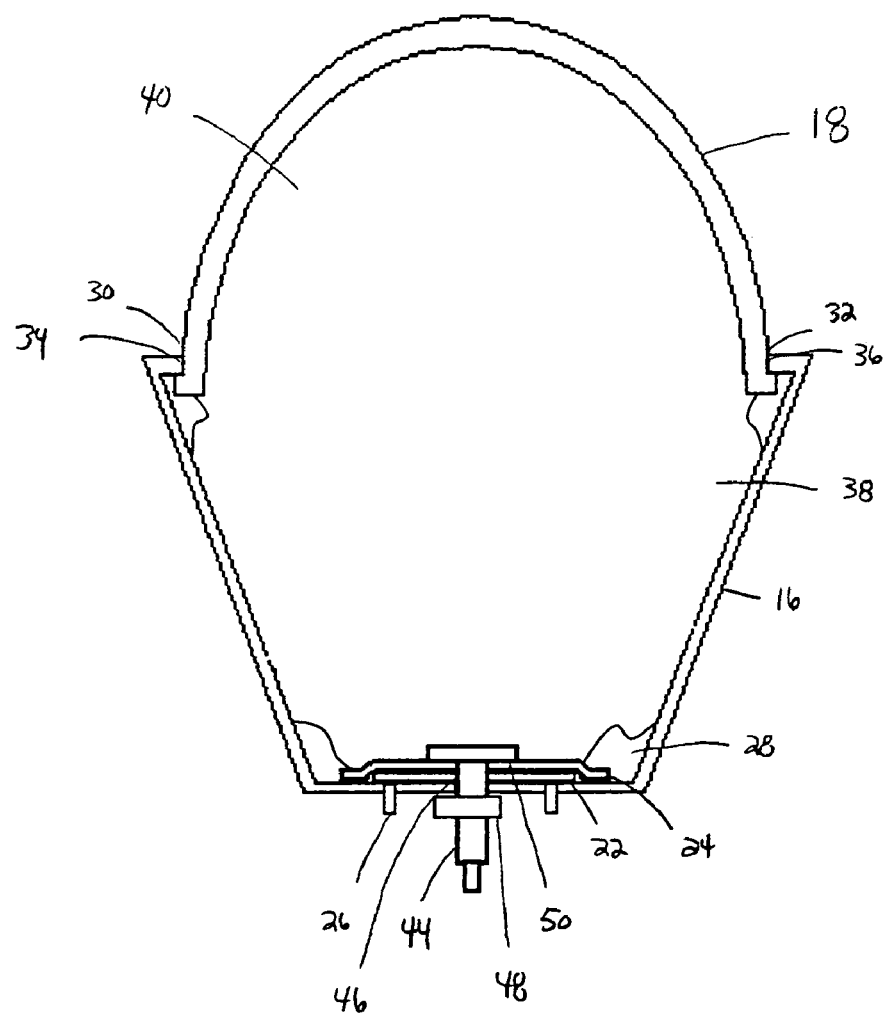
FIG. 2 is a cross-section of a non-tubeless rim and tire retrofitted according to the present invention and FIG. 3 is a cross-section of a non-tubeless rim and tire retrofitted according to the present invention.

As seen in FIG. 2, the system of the present invention comprises rim 16, a single layer of nylon reinforced tape 22 extending along its outer circumference and in complete covering relationship to spoke holes 26. Nylon table 22 is preferably a commercial grade tape rated for 300 psi and should be narrower than the base of rim cavity 38 to insure proper sealing. Some rims 16 to be retrofitted may already contain an acceptable layer of nylon tape. Rim 16 is also lined with a rubber sealing tape 24 along the outer circumference of its inner cavity 38 and in complete covering relationship to spoke holes 26 and nylon tape 24. Sealing tape 24 can be any commercially available electrical tape wide enough to cover spoke holes 26 as well as nylon tape 24. Sealing tape 24 should be conformed to irregularities in rim 16 to insure an airtight seal.

A sealing compound 28 fills and seals any leaks, perforations, and punctures and insures an airtight contact between the opposing tire beads 30 and 32 and opposing rim ridges 34 and 36. Sealing compound 28 comprises a mixture of a natural liquid latex that contains ammonia and a corresponding amount of water. Compound 28 can vary from one to five teaspoons of liquid latex for every ¼ cup of water to form a mixture which is non-viscous enough to seal punctures but viscous enough to flow through tire 18. Depending on temperatures and humidity, sealing compound 28 made with water will generally last one to six weeks, after which more compound should be added to maintain proper tire inflation and protect against punctures. In addition to allowing the conversion of a standard tire to a tubeless tier, the use of sealing compound 28 will also immediately seal any punctures as they occur during operation of the bicycle.

Sealing compound 28 may optionally contain propylene glycol to slow the drying of compound 28. To prepare a quart of sealing compound 28 according to this embodiment, six ounces of liquid latex should be mixed with 14 ounces of water and 12 ounces of propylene glycol. Compound 28 should first be prepared by mixing liquid latex with water and then adding the propylene glycol. In addition to providing a tackier, longer-lasting compound 28k this mixture will also resist freezing at operating temperatures below 32 degrees Fahrenheit.

Sealing compound 28 may additionally contain approximately ½ ounce of an aggregate material. Aggregate material is comprised of a mixture of different size particle which aid in filling larger punctures which may develop in tire 18 by helping to fill in the larger space formed by a puncture while sealing compounds fills the interstitial gaps. The size of the particles in aggregate material should vary between about 0.15 mm to 0.60 mm. A substance which can serve as the aggregate material is commercially available ground cornmeal. One useful sample of cornmeal contained 41.6 percent of particle between about 0.30 mm and about 0.6 mm and 39 percent of particle between about 0.15 mm and about 0.30 mm. Stable compounds, such as polymer resins, which can be formed into the appropriate diameter ranges may also be used.

Retrofitting a non-tubeless wheel involves first removing tire 18 and disposing of the tube and rim strip, if any. Rim 16 should be thoroughly cleaned with an appropriate lacquer thinner or enamel reduced to remove excess debris. Rim 16 should also be sanded with a scouring pad or fine sand paper to debur spoke holes 26. If rim 16 contains any spoke alignment holes, the holes should be filled with a fast setting epoxy. The hole left by the removal of the inner tube valve stem 20 should be at least 19/64 of an inch and should be drilled out if smaller and then deburred.

Nylon reinforced tape 22 is first applied to the outer circumference of rim 16 so that spoke holes 26 are entirely covered. As some rims to are retrofitted may already contain a layer of tape, this step is optional. First end of tape 22 is placed between adjacent spoke holes 26 and then wrapped around the base of channel 38 for one revolution and allowed to overlap the first end by approximately two inches. Sealing tape 24 is applied in the same manner, avoiding any wrinkling or undue stretching of tape 24. The hole through which the inner tube valve stem 20 formerly passed must be cleared for insertion of a replacement valve stem 44 by inserting a pointed implement, such as a Philips head screwdriver through nylon tape 22 and sealing tape 24. The hole for valve stem 44 should subsequently be cleaned using downward stroked with a round file or similar instrument to remove any excess tape 22 or 24.

Installation of a replacement valve stem 44 using of a smaller amount of sealing compound 28 onto the rubber portion 46 of valve stem 20. Valve stem 20 is then inserted into the prepared valve stem hole and a valve nut 48 is tightened by hand onto threaded portion of valve stem 20 while maintaining pressure on base 50.

Figure 3:
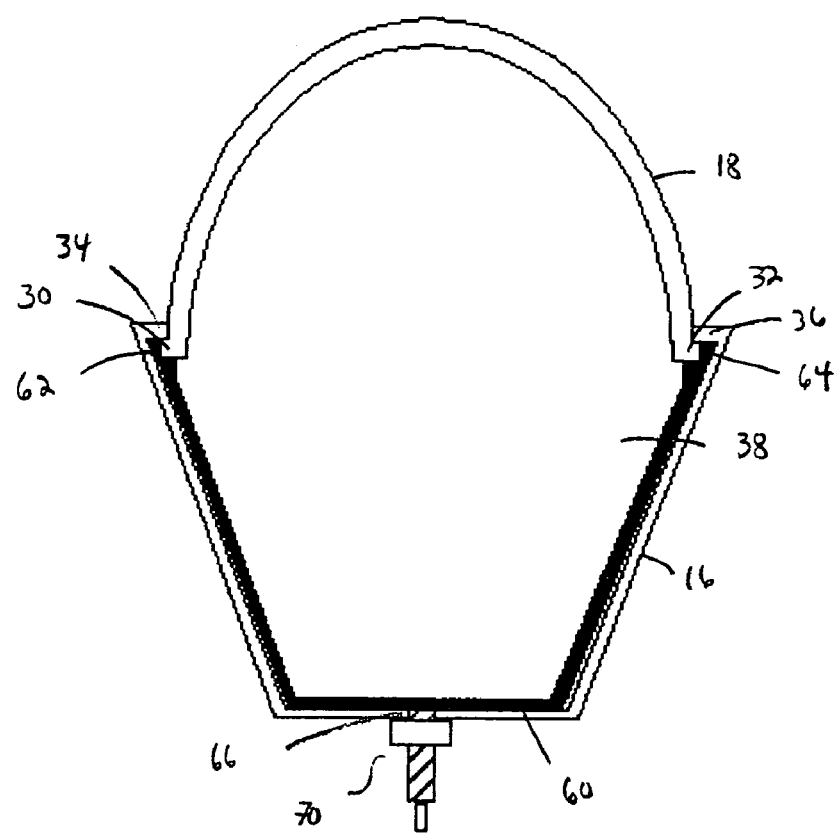
Figure 4:
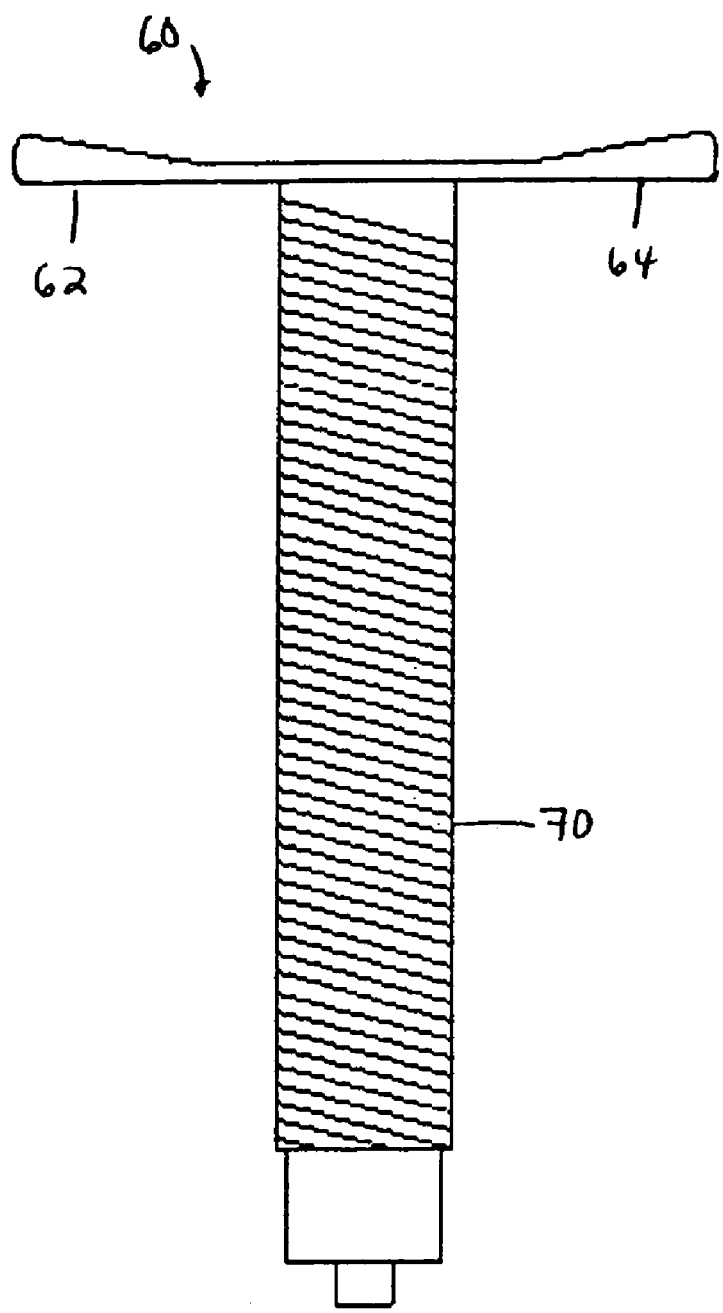
FIG. 4 is a cross-section of a rim strip according to the present invention.

As seen in FIGS. 3 and 4, a rim strip 60 with an integral valve stem 70 may be used instead of the double seal provided by nylon tape 22 and sealing tape 24. Rim strip 60 can be made from butyl rubber molded onto a circular strip. The outer edges 62 and 64 of rim strip 60 have an increased thickness from median portion of rim strip 60. Rim strip 60 is wide enough so that outer edges 62 and 64 will engage rim ridges 34 and 36 when rim strip 60 is seated into rim channel 38. The diameter of rim strip 60 should be less than the diameter of rim 16 to insure a tight fit after installation. The width of rim strip 60 can vary depending on the size of rim 16 as commercially manufactured rims 16 are made in a variety of width and diameters. An airtight seal is formed by beads 30 and 32 engaging outer edges 62 and 64 and rim ridges 34 and 36, correspondingly. Installation involves stretching rim strip 60 over rim 16 and into rim channel 38. Integral valve stem 70 is placed into valve stem hole 66 and rim strip 60 is allowed to radially contact into contact with base of rim channel 38.

Mounting of tire 18 is accomplished by resting rim 16 in a horizontal plane and aligning lower bead 30 of tire 18 within the rim channel 38 and in contact with rim ridge 34. Sealing compound 28 is then poured inside tire cavity 40 and upper bead 32 is seated inside corresponding rim ridge 36. Tire 18 can now be inflated via valve stem 44, preferably by an air compressor as inflation may require substantial amounts of air while seating mixtures 28 seals beads 30 and 32, as well as any other avenues from which air may escape. Wheel 10 should be held in vertical plane while inflating so beads 30 and 32 are not distorted. Rotation of wheel 10 after inflation will allow sealing compound 28 to thoroughly coat the inner surfaces of channel 38 or tire cavity 40 and seal any leaks. Wheel 10 can then be installed onto a bicycle, which should be ridden for a minimum of thirty minutes to ensure proper distribution of sealing compound 28 throughout the rim channel 38 and tire cavity 40.

What is claimed is:

1. A system for converting and retrofitting a bicycle wheel having a tire with an inner cavity and opposing first and second beads engaged to a rim with an inner channel and first and second opposing ridges, said system comprising:
   a rim strip having first and second outer edges separated by a median portion disposed within said channel, wherein said first and second outer edges engage said first and second beads and said first and second ridges;
   a valve stem integrally formed with said rim strip and having a hole formed therethrough which is in communication with said inner cavity; and
   a liquid sealing compound disposed within said channel and said cavity for sealing along said ridges and said beads, wherein said sealing compound comprises:
      about 3 parts by volume liquid latex;
      about 7 parts by volume water; and
      about 6 parts by volume propylene glycol.

2. The system of claim 1, wherein said first and second outer edges are thicker in cross-section that said median portion of said rim strip.

3. The system of claim 2, wherein said rim strip is a circular strip.

4. The system of claim 3, wherein said rim strip has a diameter slightly less than the diameter of said rim.

5. The system of claim 4, wherein said rim strip is formed of rubber.

6. The system of claim 5, wherein said rim strip is formed of butyl rubber.

7. The method of converting and retrofitting a bicycle wheel having a tire with an inner cavity and opposing first and second beads engaged to a rim with an inner channel and first and second opposing ridges, said method comprising:
   inserting a rim strip having first and second outer edges separated by a median portion disposed within said channel of said rim;
   placing a liquid sealing compound within said channel and said cavity for sealing along said ridges and said beads, wherein said sealing compound comprises:
      about 3 parts by volume liquid latex;
      about 7 parts by volume water; and
      about 6 parts by volume propylene glycol;
   engaging said tire with said rim so that said first and second outer edges of said rim strip engage said first and second beads and said first and second ridges;
   inflating said tire by injecting air through a valve stem that is integrally formed with said rim strip and has a hole formed therethrough in communication with said inner cavity of said tire; and
   spinning said wheel to distribute said sealing compound along said ridges and said beads.

8. The system of claim 7, wherein said rim strip is a circular strip.

9. The system of claim 8, wherein said rim strip has a diameter slightly less than the diameter of said rim.

10. The system of claim 9, wherein said rim strip is formed of rubber.

11. The system of claim 10, wherein said rim strip is formed of butyl rubber.

* * * * *